United States Patent [19]
Kiel et al.

[11] Patent Number: 4,905,171
[45] Date of Patent: Feb. 27, 1990

[54] WORKSTATION CONTROLLER PERFORMANCE MONITOR

[75] Inventors: Harvey G. Kiel; Jeffrey E. Remfert; Jeffery J. Van Heuklon, all of Rochester, Minn.

[73] Assignee: International Business Machines Corporation, Armonk, N.Y.

[21] Appl. No.: 117,864

[22] Filed: Nov. 9, 1987

[51] Int. Cl.[4] ............................................. G06F 11/34
[52] U.S. Cl. ............................... 364/551.01; 364/200; 364/264; 364/264.6; 364/264.7; 364/550
[58] Field of Search ................ 364/200 MS File, 550, 364/551.01

[56] References Cited

U.S. PATENT DOCUMENTS

| | | | |
|---|---|---|---|
| 3,588,376 | 6/1971 | Rash | 360/60 |
| 3,818,458 | 6/1974 | Deese | 364/200 |
| 4,034,353 | 7/1977 | Denny et al. | 364/200 |
| 4,099,235 | 7/1978 | Hoschler et al. | 364/200 |
| 4,126,895 | 11/1978 | Weemaes et al. | 364/200 |
| 4,369,493 | 1/1983 | Kronenberg | 364/200 |
| 4,485,440 | 11/1984 | Duff et al. | 364/200 X |
| 4,495,562 | 1/1985 | Yamaji et al. | 364/200 |
| 4,590,550 | 5/1986 | Eilert et al. | 364/200 |
| 4,601,008 | 7/1986 | Kato | 364/900 |
| 4,821,178 | 4/1989 | Levin et al. | 364/200 |

OTHER PUBLICATIONS

Frassetto et al., Realtime Throughput Measurement, Mar. 1984, IBM Technical Disclosure Bulletin, vol. 26, No. 10B, pp. 5688–5689.

Callaway, General Purpose Data Collection Method, IBM Technical Disclosure Bulletin, vol. 16, No. 6, 11/73, pp. 1796–1798.

Hennet et al., Serial Channel Utilization Distribution, IBM Technical Disclosure Bulletin, vol. 22, No. 1, 6/79, pp. 245–247.

Borysowich et al., Network Monitor, IBM Technical Disclosure Bulletin, vol. 25, No. 2, 7/82, pp. 543–547.

*Primary Examiner*—Parshotam S. Lall
*Assistant Examiner*—Edward R. Cosimano
*Attorney, Agent, or Firm*—Curtis G. Rose

[57] ABSTRACT

A workstation controller (WSC) performance monitor for locating performance bottlenecks is disclosed. The user notifies the host that he wants to start performance measurements. The host notifies each of the workstation controllers to begin collecting data that can be used to determine processor performance and communications line performance for each workstation controller. This data is collected in counters that reside in the storage of each of the workstation controllers. In the preferred embodiment, this data is periodically sent to a data base contained in the storage of the host. When the user specified length of time to collect data has expired, the host informs each of the connected workstation controllers to stop taking measurements. The data contained in the counters is sent to the database in the host and the host calculates processor utilization and communications line utilization for each of the connected workstation controllers. If the processor utilization falls below a first threshold, the performance of that processor is acceptable. If the processor utilization is greater than a second threshold, the performance of that processor is not acceptable. If the processor utilization is in between the first and second thresholds, the processor performance is considered marginal and a more complicated calculation of workload evenness of the processor is performed. If the workload is considered to be uneven, the performance of that processor is considered to be unacceptable.

17 Claims, 8 Drawing Sheets

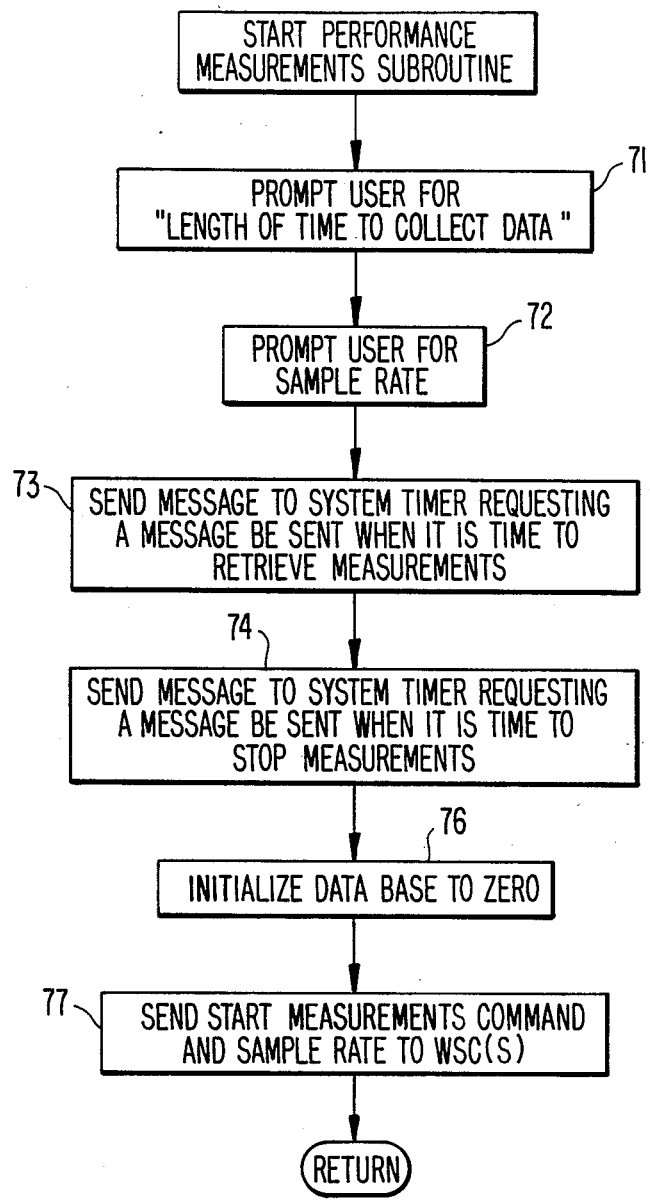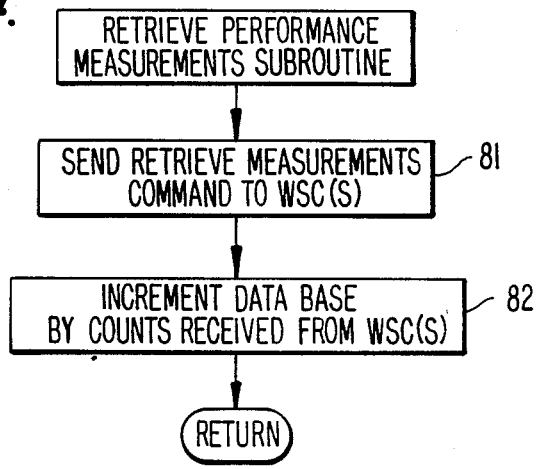

WORKSTATION CONTROLLER PERFORMANCE MONITOR

FIELD OF THE INVENTION

This invention relates to the data processing field. More particularly, this invention is a computer system that is capable of informing the user where performance bottlenecks are.

BACKGROUND OF THE INVENTION

The typical computer system has a host computer connected to one or more workstation controllers. Each of the workstation controllers (WSC) is connected to one or more deices. When the user notices poor response time on the device, he or she wants to know what is responsible for the poor response time. Often the WSC driving that device may be the source of the problem. When the user notices poor response time it would be desirable to have a computer system that is capable of informing the user of the location of the bottleneck quickly and efficiently so that corrections can be made.

Several attempts have been made in the past to achieve a computer system capable of efficiently detecting bottlenecks, but they are usually quite cumbersome and often involve a large amount of additional hardware to carry out the function. In addition, prior attempts were usually so complex only a trained service representative could interpret the data.

SUMMARY OF THE INVENTION

It is a principle object of the invention to monitor, in an improved manner, the utilization of a workstation controller processor in a computer system and be able to report to the user if the processor is overutilized.

Another object of the invention is to monitor, in an improved manner, a workstation controller communications line in a computer system and be able to report to the user if it is over utilized.

These and other objects are accomplished by a suitably programmed host computer and workstation controller disclosed herein.

The user notifies the host that he wants to start performance measurements. The host notifies each of the workstation controllers to begin collecting data that can be used to determine processor performance and communications line performance for each workstation controller. This data is collected in counters that reside in the storage of each of the workstation controllers. In the preferred embodiment, this data is periodically sent to a data base contained in the storage of the host. When the user specified length of time to collect data has expired, the host informs each of the connected workstation controllers to stop taking measurements. The data contained in the counters is sent to the database in the host and the host calculates processor utilization and communications line utilization for each of the connected workstation controllers. If the processor utilization falls below a first threshold, the performance of that processor is acceptable. If the processor utilization is greater than a second threshold, the performance of that processor is not acceptable. If the processor utilization is in between the first and second thresholds, the processor performance is considered marginal and a more complicated calculation of workload evenness of the processor is performed. If the workload is considered to be uneven, the performance of that processor is considered to be unacceptable.

Likewise, if the communications line utilization falls below a first threshold, the communications line performance is considered to be acceptable. If the communications line utilization is greater than a second threshold, the communications line performance is considered to be unacceptable. If the communications line utilization falls between the first and second thresholds, the communications line performance is considered marginal and a more complicated calculation of workload evenness of the communications line is performed. If the result of this calculation is that the workload is uneven, the performance of the communications line is unacceptable. These calculations are repeated for all the workstation controllers connected to the host and the user is informed if any workstation controller, either due to its processor or its communications line, has an unacceptable performance. The user can analyze this data and determine that devices need to be rearranged on the controllers to balance out the load or that perhaps additional workstation controllers are needed.

BRIEF DESCRIPTION OF THE DRAWING

FIGS. 2-5 show a flow chart of the programmed host processor of the preferred embodiment.

DESCRIPTION OF THE PREFERRED EMBODIMENT

Figure 1:
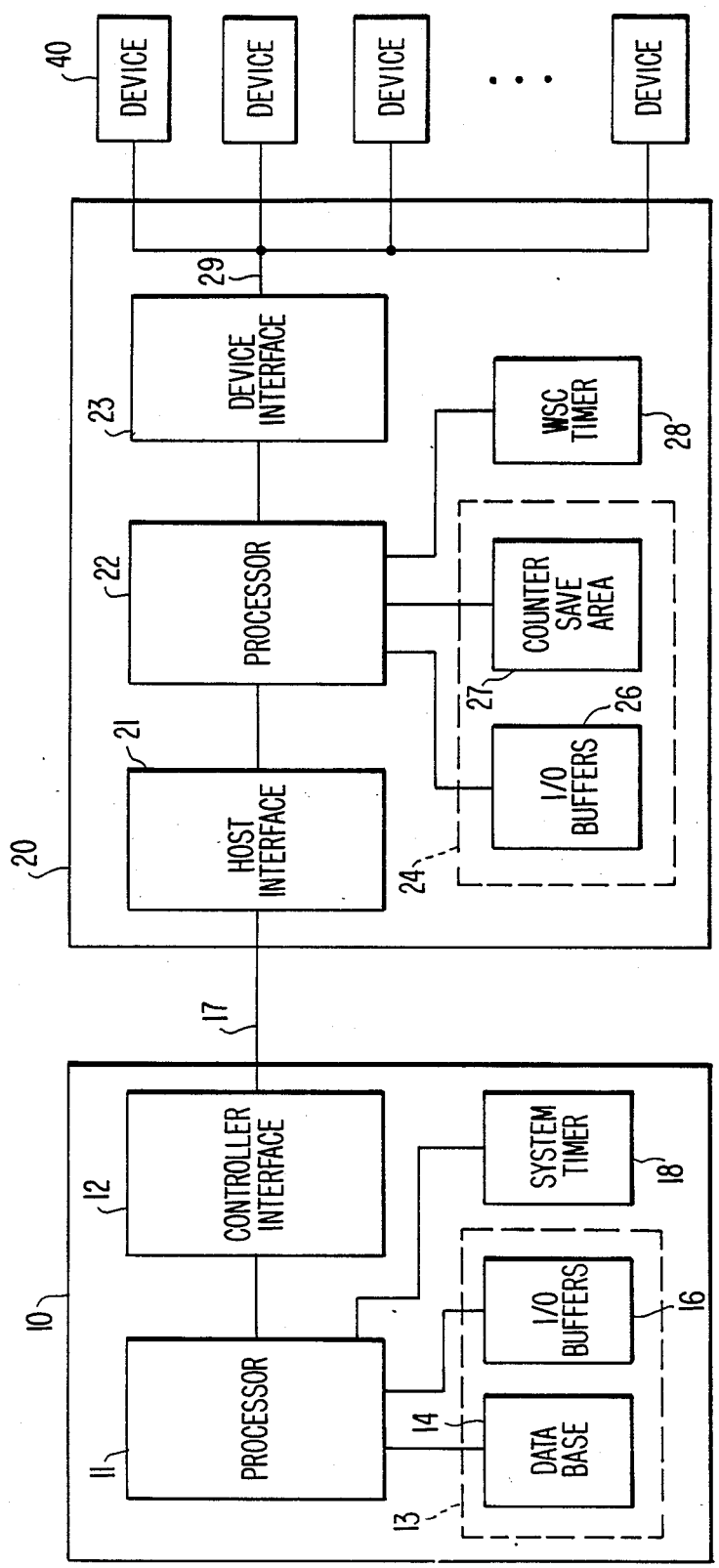
FIG. 1 shows a block diagram of the host computer and workstation controller and devices of the invention.

FIG. 1 shows an overall block diagram of the invention. Host 10 is connected to workstation controller (WSC) 20 which is connected to a group of devices 40. Although not shown, several workstation controllers can be connected to host 10 similar to WSC 20. Host 10 has a processor 11 which is connected to controller interface 12, storage 13 and system timer 18. Storage 13 is made up of data base area 14 and I/O buffers 16. Processor 11 is a typical processor known to those in the art, suitably programmed to operate as discussed later in conjunction with FIGS. 2-5. Controller interface 12 communicates with WSC 20 via line 17. Line 17 can be a system bus, communications line, part of a local area network or other communications means. In the preferred embodiment, line 17 is a system bus. Line 17 can also be connected to several other workstation controllers similar to WSC 20. WSC 20 consists of processor 22 connected to host interface 21, device interface 23, storage 24, and WSC timer 28. Storage 24 consists of I/O buffers 26 and counter save area 27. Host interface 21 communicates with host 10 over line 17. Device interface 23 communicates with devices 40 connected to WSC 20 over communications line 29. Processor 22 is a typical processor known to those in the art suitably programmed to operate as discussed later in conjunction with FIGS. 6-10.

Figure 5:
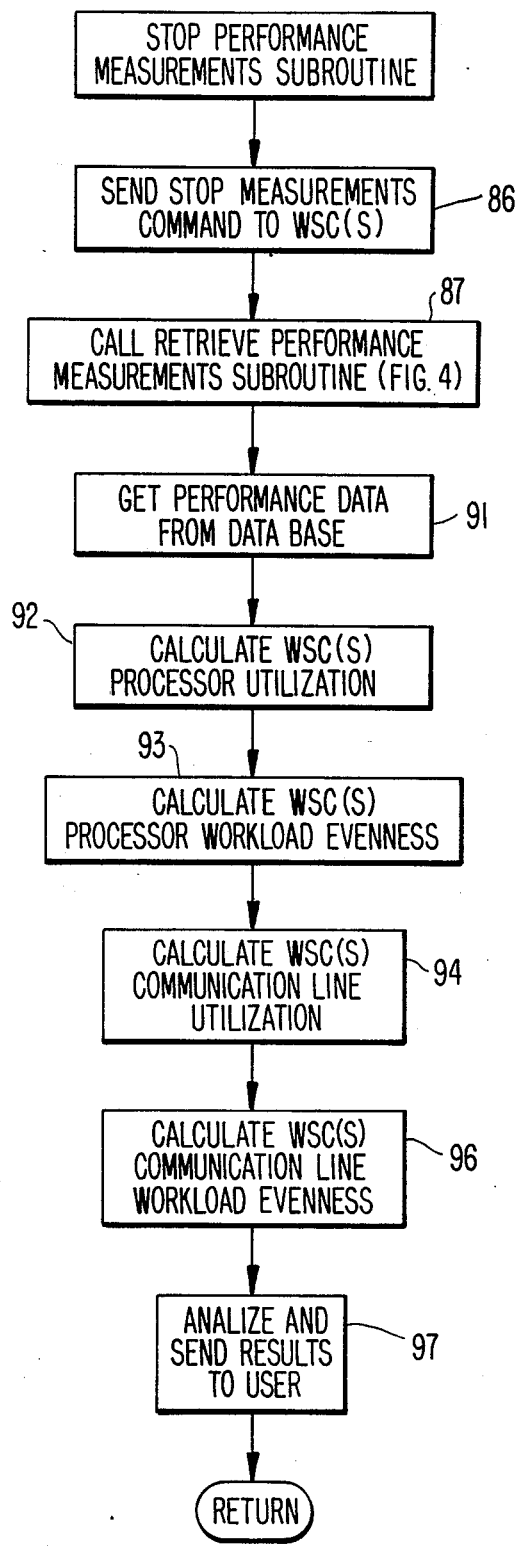

FIGS. 2-5 show a flow chart of how host 10, more specifically host processor 11, is programmed to determine the performance of the attached workstation controllers. After initialization is performed in block 51, the processor looks to see if there are any tasks to do in its processor task queue as shown in block 52. An infinite loop is entered here until processor 11 determines that there is a task to do and control moves to block 53. In block 53 the task is analyzed to see whether it is a request from the user to start performance measurements. If so, the start performance measures subroutine of FIG. 3 is Called, as shown in block 54. If not, block 56 determines whether the task is system timer 18 specifying to retrieve performance measurements. If so, the retrieve performance measurement subroutine of FIG. 4 is called as shown in block 57. If not, block 58 asks if the task is system timer 18 specifying to stop performance measurements. If so, the stop performance measurements subroutine of FIG. 5 is called in block 59. If not, processor 11 looks in block 61 to see if another valid task has been specified. If another valid task has been specified, that task is processed as shown in block 62. If the task is not valid, an error message is posted in block 63. In either event, control is returned back to block 52 for it to see if there are any other tasks in the processor task queue to perform.

The start performance measurements subroutine of FIG. 3 will now be discussed. The user is first prompted for the length of time to collect data in block 71. The user is then prompted for the sample rate in block 72. The sample rate is sent to the WSC and used in taking performance measurements. In the preferred embodiment, if the user does not specify values for block 71 and 72, default values will be assumed. The sample rate should be fast enough to get a good statistical sample but not too fast to become a burden on the processor and skew the processor utilization measurements. In block 73, a message is sent to system timer 18 that requests to be notified when it is time to retrieve measurements. Measurements are retrieved before the counters in WSC 20 overflow. In block 74, a message is sent to system timer 18 requesting to be informed when it is time to stop measurements. This is based on the user specified length of time to collect data. Any information contained in data base 14 is initialized to zero in block 76. In block 77, the Start Measurements command and sample rate (if specified by the user) are sent to the attached workstation controllers. The subroutine then returns to block 52 of FIG. 2.

Figure 2:
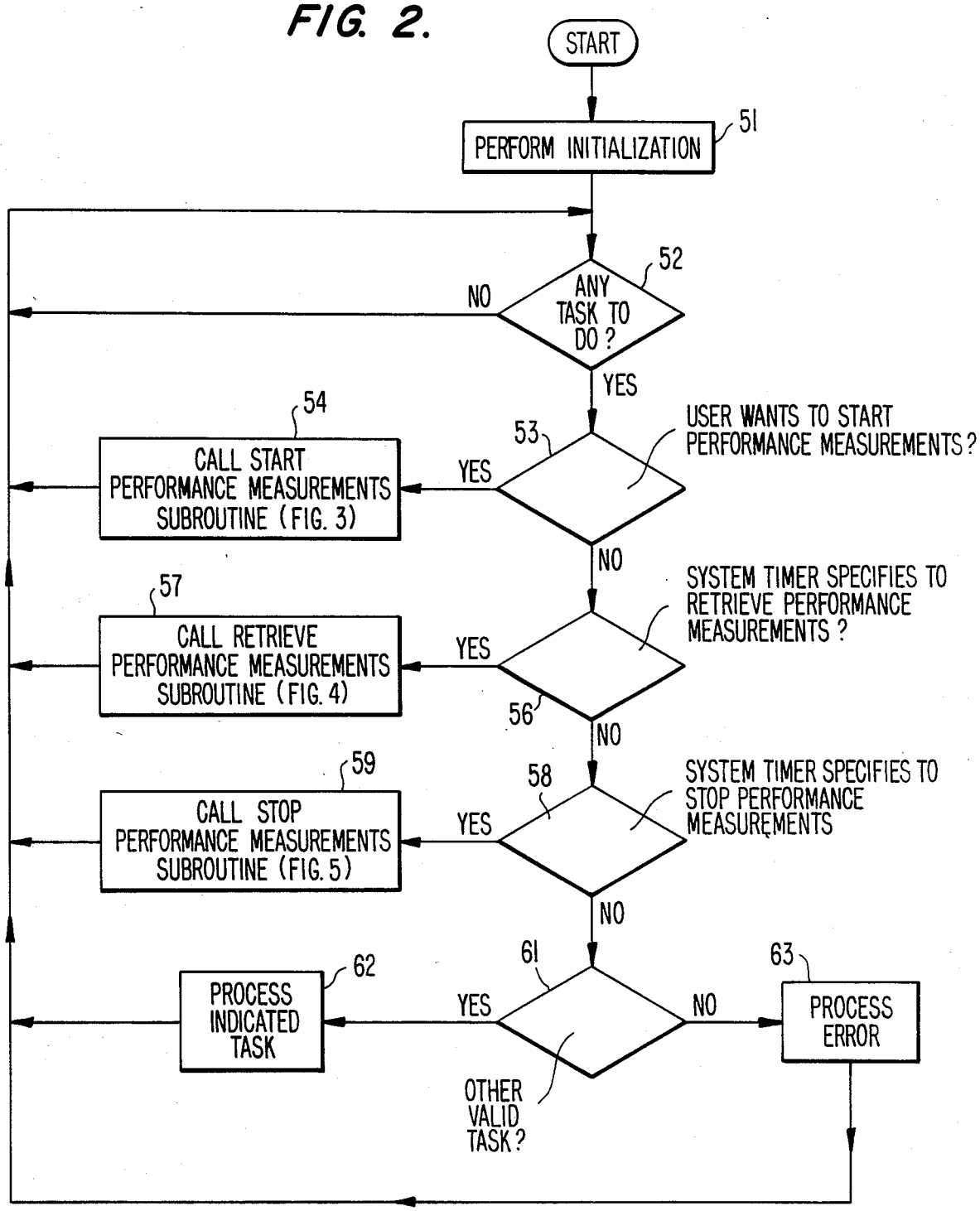

When system timer 18 specifies in block 56 of FIG. 2 that it is time to retrieve performance measurements, the retrieve performance measurements subroutine of FIG. 4 is called. In block 81, the Retrieve Measurements command is sent to the attached workstation controllers. Upon receipt of this command, as will be discussed later in conjunction with FIG. 10, the workstation controllers send performance measurements data to the host and in block 82 the data contained in data base 14 is incremented with this data from the controllers. The subroutine then returns to block 52 of FIG. 2.

When system timer 18 specifies in block 58 of FIG. 2 that it is time to stop performance measurements, the stop performance measurements subroutine of FIG. 5 is called. The Stop Measurements command is sent to the attached workstation controllers in block 86. The retrieve performance measurements subroutine as shown in FIG. 4, as previously discussed, is then called in block 87. After performance data in the data base is incremented in block 82, processor 11 begins to process the performance data contained in the data base in block 91. The workstation controller processor utilization is calculated in block 92 as will be discussed later. The workstation controller processor workload evenness is calculated in block 93, as will be discussed later. Likewise, the workstation controller communications line utilization and workload evenness are calculated in blocks 94 and 96, as will also be discussed later. After these calculations are performed, results are analyzed and sent to the user in block 97. The subroutine then returns to block 52 of FIG. 2.

Concurrent with the operation of host processor 11 as shown in FIGS. 2-5, workstation controller processor 22 is operating as shown in FIGS. 6-10. After initialization is performed in block 101, workstation controller processor 22 checks its processor task queue to see if there is any tasks to do in block 102. If there is not any tasks to do, an idle loop counter is incremented in block 103 and control returns immediately to block 102. The count contained in the idle loop counter will be used to determine the workstation controller processor utilization, as will be discussed later. The amount of time it takes to check to see if there is any task to do in block 102, increment idle loop counter 103, and return to block 102 is called the idle loop time. The idle loop time of a WSC can be different than the idle loop time of other WSCs. In the preferred embodiment, the idle loop counter is a four byte counter and the idle loop time is approximately 10 microseconds.

Figure 6:
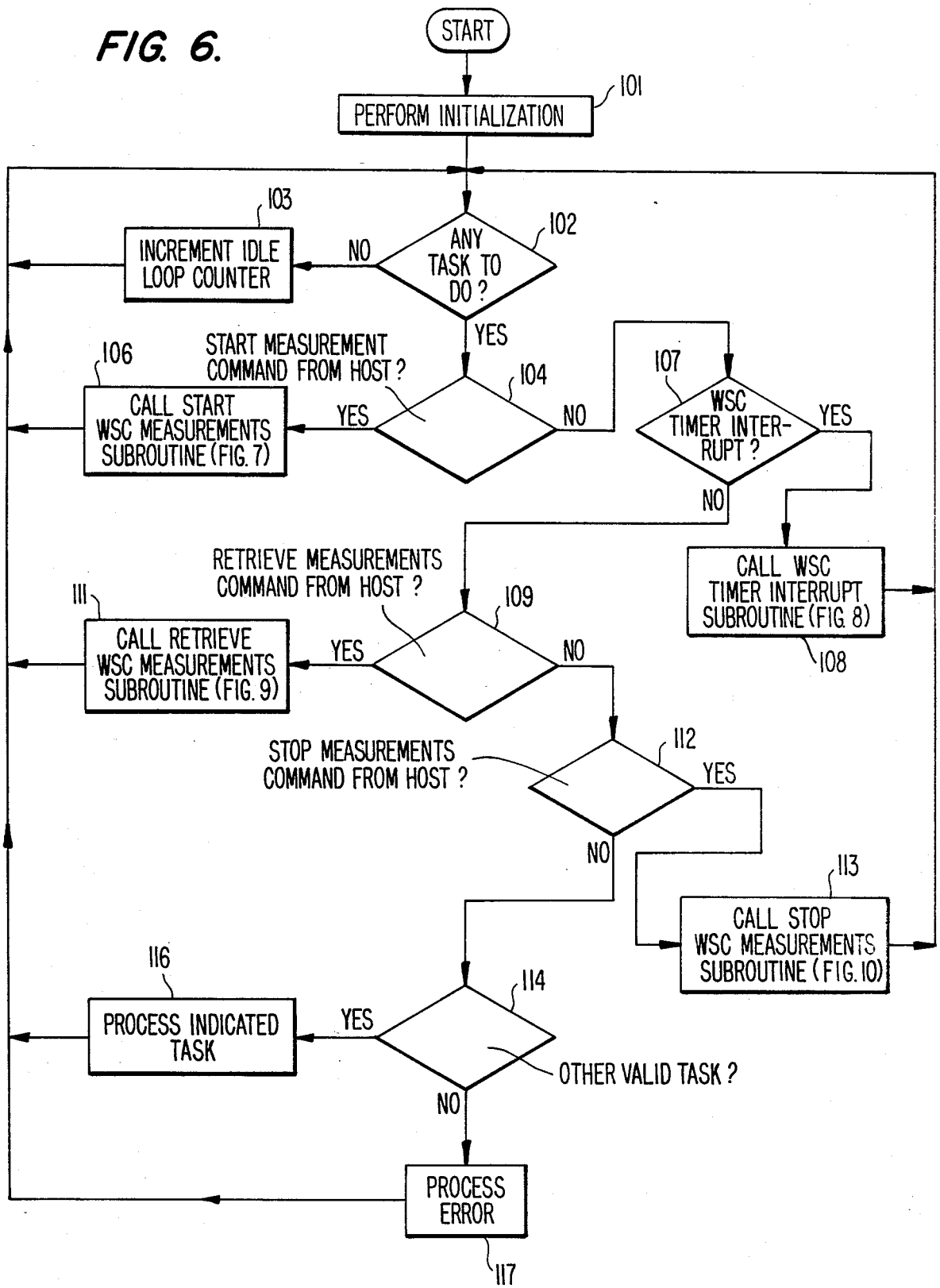
FIGS. 6-10 show a flow chart of the programmed workstation controller processor of the preferred embodiment.
Figure 7:
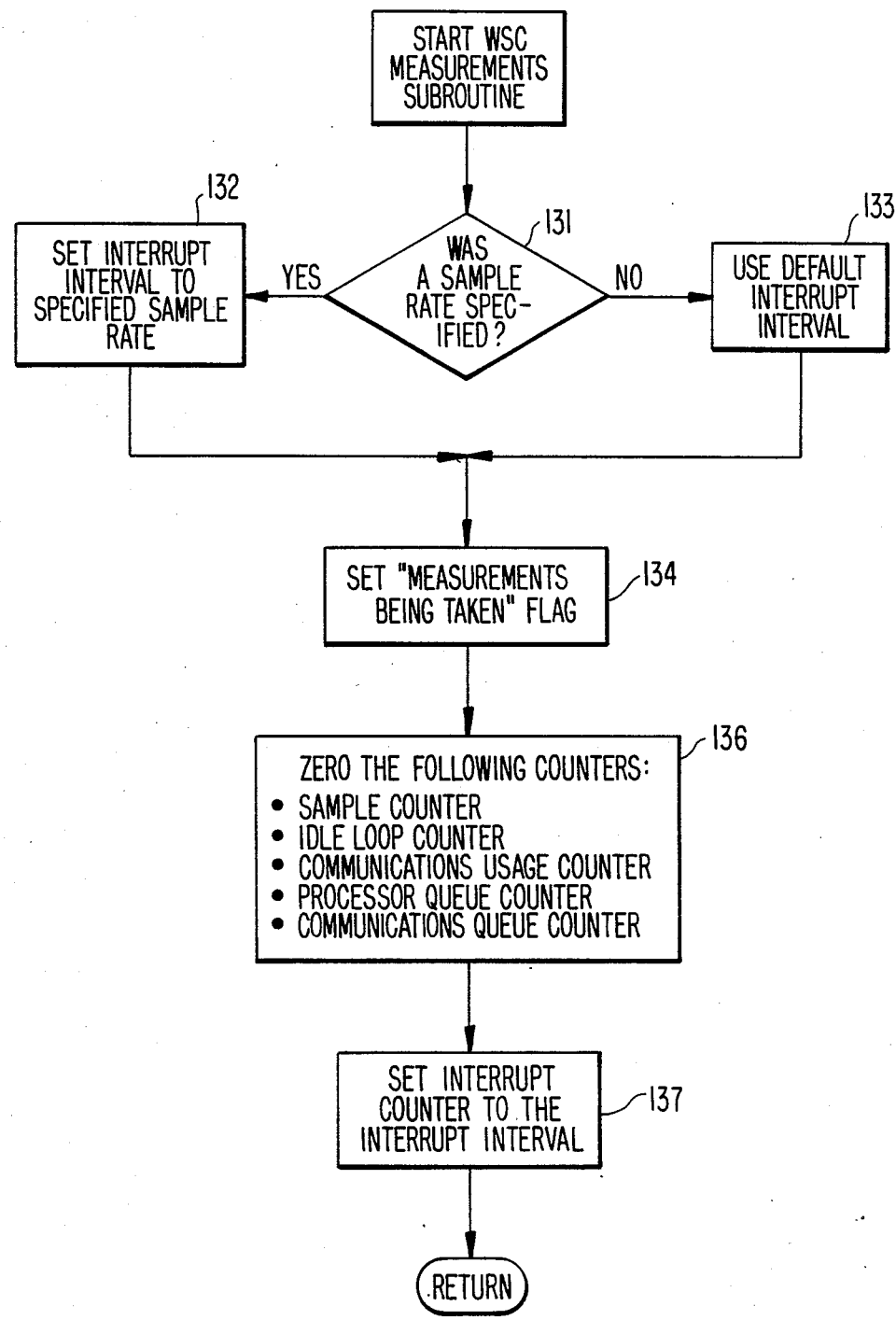
Figure 8:
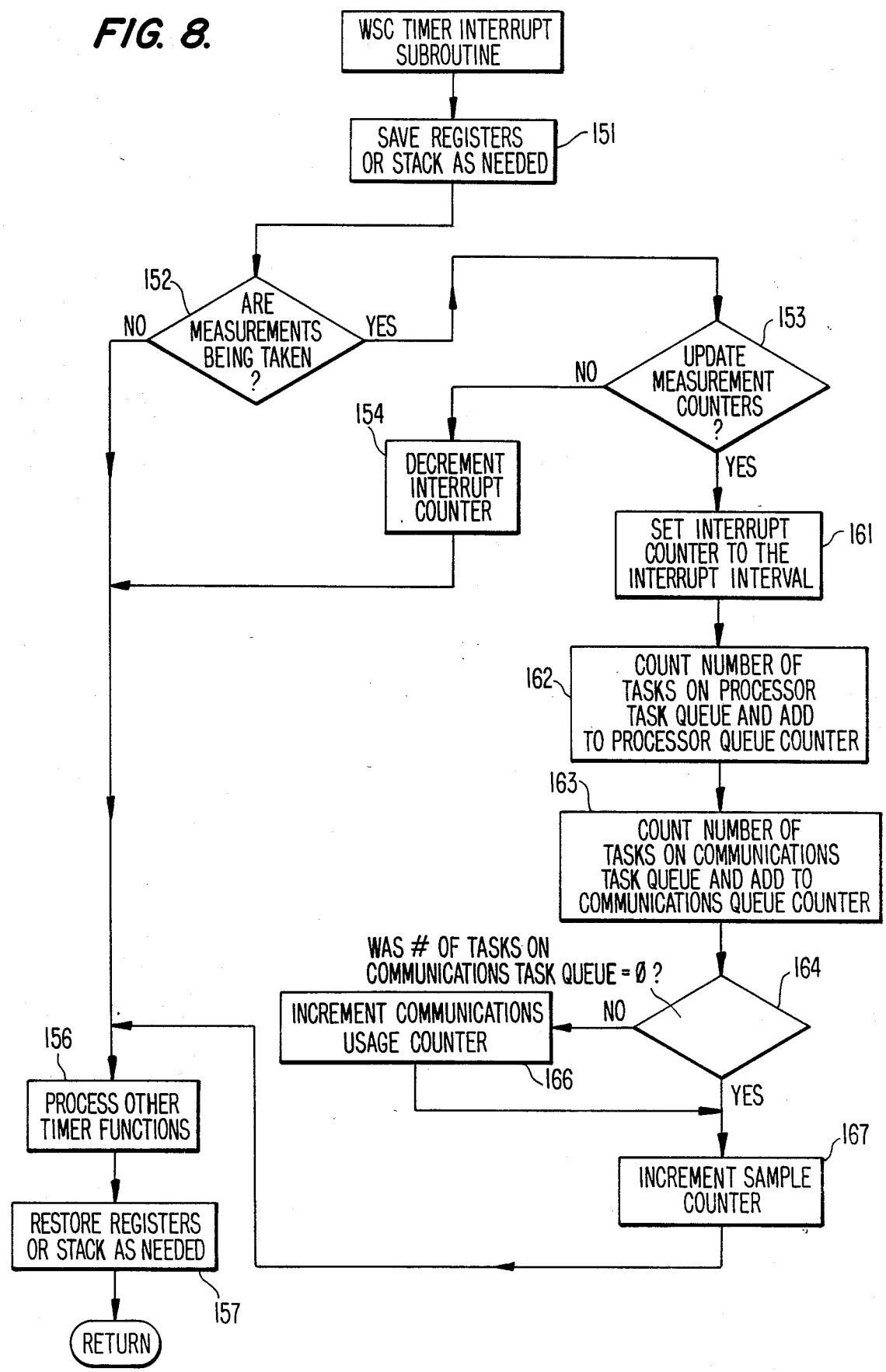
Figure 9:
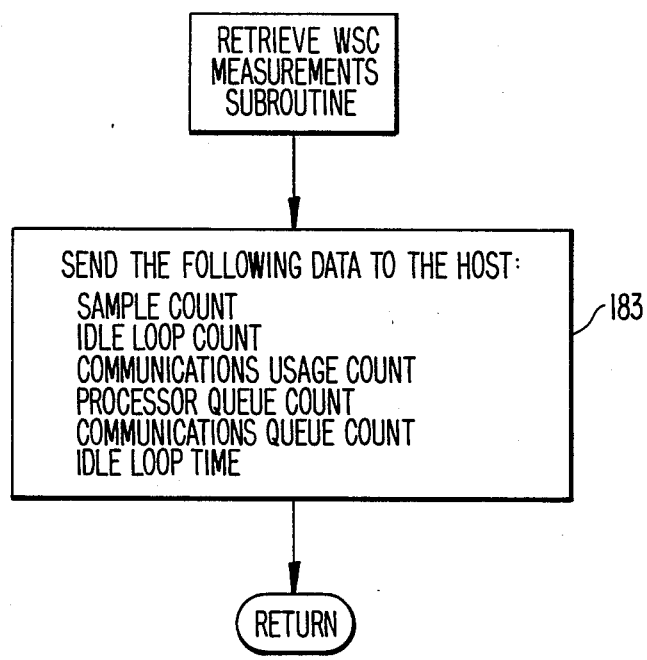

The idle loop as shown in blocks 102 and 103 continues until a task is placed in the processor task queue at which time processor 22 looks at the task in block 104 to see if it is a Start Measurements command sent from the host in block 77 of FIG. 3. If the host did send a Start Measurements command to the workstation controller, block 104 of FIG. 6 is answered affirmatively and the start workstation controller measurements subroutine of FIG. 7 is called in block 106. If the task was not a Start Measurements command from the host, processor 22 looks to see whether it was a timer interrupt from WSC timer 28 as shown in block 107. If the task was a timer interrupt, the WSC timer interrupt subroutine of FIG. 8 is called in block 108. If the task was not a timer interrupt, processor 22 looks to see whether it was a Retrieve Measurements command from the host as shown in block 109. If the host has sent the workstation controller a Retrieve Measurements command in block 81 of FIG. 4, block 109 of FIG. 6 is answered affirmatively and the retrieve workstation controller measurements subroutine of FIG. 9 is called in block 111.

Figure 10:
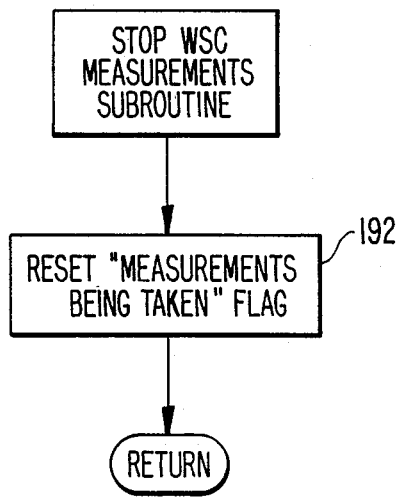

If the task in the processor task queue was not a Retrieve Measurements command from the host, processor 22 looks to see if it was a Stop Measurements command from the host as shown in block 112. If the host has sent the workstation controller a Stop Measurements command in block 86 of FIG. 5, block 112 is answered affirmatively and the stop workstation controller measurements subroutine of FIG. 10 is called in block 113. If not, processor 22 looks to see whether this is another valid task that it can perform in block 114. If yes, the indicated task is processed in block 116. If the task is not valid, an error message is posted in block 117. In either event, control is returned to block 102 of FIG. 6 to look to see if any other tasks need to be performed.

The start workstation controller measurements subroutine of FIG. 7 Will now be discussed. If the user specified a sample rate in block 72 of FIG. 3, block 131 of FIG. 7 is answered affirmatively and an interrupt interval is set to the specified sample rate in block 132. In the preferred embodiment, o timer 28 interrupts workstation controller processor 22 every 50 milliseconds and if, for example, the sample rate was specified by the user as 200 milliseconds, the interrupt interval would be set to be 4, which would be 4 times the timer interrupt of 50 miliseconds. If the user did not specify the sample rate, a default interrupt interval is set in block 133. In either event, control moves to block 134 where a "Measurements Being Taken" flag is set.

In order to determine the performance of the processor and communications line of workstation controller 20, five counters are saved in counter save area 27 as shown in FIG. 1. The counters are initialized in block 136 of FIG. 7. Counters used are a sample counter, an idle loop counter, a communications usage counter, a processor queue counter, and a communications queue counter. In the preferred embodiment, the communications usage counter and communications queue counter are used in calculating the performance of communications line 29 connecting WSC 20 with devices 40 in FIG. 1. The interrupt counter is set to the interrupt interval in block 137. Control returns back to block 102 in FIG. 6.

When WSC timer 28 interrupts processor 22, the WSC timer interrupt subroutine of FIG. 8 is called. If controller 20 was working on anything before the timer interrupt was received, the work is saved in block 151. If the "Measurements Being Taken" flag is not set, block 152 is answered negatively and flow of control goes to block 156, where other timer functions are processed. If the "Measurements Being Taken" flag is set, block 152 of FIG. 8 is answered affirmatively. Block 153 looks to see whether the counters need to be updated on this timer interrupt (interrupt counter=1). If not, the interrupt counter is decremented in block 154, other timer functions are processed in block 156 and any work that was outstanding prior to the timer interrupt is restored in block 157. Control then returns back to block 102 in FIG. 6 to process any other tasks. If block 153 determines the measurement counters need to be updated on this timer interrupt, the interrupt counter is first set to the interrupt interval in block 161 in a manner similar to that of block 137 of FIG. 7, for future use. Block 162 looks at the processor task queue and counts the number of tasks waiting on the processor task queue. This count is added to the processor queue counter, which is stored in counter save area 27 of FIG. 1. This information will be used to determine the workload evenness of the workstation controller processor as will be discussed later.

Block 163 looks at the communications task queue and counts the number of tasks waiting on that queue to be performed. It adds this count to the communications queue counter which is stored in counter save area 27 of FIG. 1. This information will be used to determine the workload evenness of the workstation controller communications line, as will be discussed later.

Block 164 asks whether the number of tasks on the communications task queue was zero. If not, the communications usage counter stored in counter save area 27 of FIG. 1 is incremented in block 166. This information indicates that the communications task queue was not empty and will be used to determine communications line utilization, as will be discussed later.

In either event, the sample counter stored in counter save area 27 is incremented in block 167 to indicate one sample has been taken of the processor task queue and communications task queue. Other timer functions are processed in block 156 and any work that was outstanding prior to the timer interrupt is restored in block 157. Control returns to block 102 in FIG. 6.

If controller 20 receives a Retrieve Measurements command from the host, the retrieve workstation controller measurements subroutine of FIG. 9 is called. The counts contained in the counters of counter save area 27 (sample count, idle loop count, communications usage count, processor queue count, and communications queue count) are sent on to the host in block 183 where they are used to increment the data contained in data base 14 of host 10 as shown in FIG. 4. In addition, the idle loop time for this particular WSC is sent to the host for use in calculating processor performance measurements. Control returns to block 102 of FIG. 6.

If controller 20 receives a Stop Measurements command from the host, the stop workstation controller measurements subroutine as shown in FIG. 10 is called. The "Measurements Being Taken" flag is reset in block 192. Control returns to block 102 of FIG. 6.

As can be seen from the above discussion, processor 11 of host 10 programmed as shown in FIGS. 2-5 works concurrently with processor 22 of controller 20 as programmed in FIGS. 6-10 to determine the performance of the workstation controller. The following discussion describes a logical flow of control that includes both processors.

Assume first that both processor 11 and processor 22 are idle and block 52 of FIG. 2 and block 102 of FIG. 6 are both answered negatively. Host processor 11 is in an infinite idle loop waiting for some work to do. Processor 22 is incrementing the idle loop counter as shown in block 103 while also waiting for some work to do. While both processors are idle, the user notifies the host computer that he wants to start performance measurements. This task is placed in the processor task queue of processor 11. Blocks 52 and 53 are then answered affirmatively and the start performance measurements subroutine of FIG. 3 is called. The user is prompted for the length of time to collect data and the sample rate in blocks 71 and 72. System timer 18 is set up in blocks 73 and 74. The data base is initialized in block 76 and the Start Measurements command is sent to the workstation controller in block 77. Upon receipt of the Start Measurements command from the host, the workstation controller leaves the idle loop of blocks 102 lo and 103 as shown in FIG. 6, answers block 104 affirmatively and calls the start workstation controller measurements subroutine of FIG. 7. The interrupt interval is set to the specified sample rate in block 132. The "Measurements Being Taken" flag is set in block 134, the counters are zeroed in block 136, and the interrupt counter is set to the interrupt interval in block 137. Control returns to block 102 in FIG. 6, where processor 20 continues the idle loop of blocks 102 and 103 until the first timer interrupt from WSC timer 28 is received. When the timer interrupt is received, the timer interrupt subroutine of FIG. 8 is called.

If the user specified the sample rate such that a sample should be taken for every four timer interrupts, the interrupt counter is decremented from 4 down to 1 upon receipt of four timer interrupts. When the interrupt counter reaches 1, block 153 is answered affirmatively, and the measurement counters are updated. The interrupt counter is set to the original interrupt interval of 4 for future use. The number of tasks on the processor task queue and the communications task queue are counted and added to the processor queue counter and communications queue counter, respectively. If the communications task queue was not empty, the communications usage counter is incremented in block 166. The sample counter is incremented in block 167 and control returns back to block 102 of FIG. 6. Subsequent timer interrupts are handled in the same manner.

Referring back to FIG. 2, when system timer 18 specifies that it is time to retrieve the performance measurements, the retrieve performance measurements subroutine of FIG. 4 is called. The Retrieve Measurements command is sent to the workstation controller in block 81 and is placed in the processor task queue of processor 22. Block 109 of FIG. 6 is answered affirmatively upon receipt of the Retrieve Measurements command from the host and the retrieve workstation controller measurements subroutine of FIG. 9 is called. The counts contained i the five counters of counter save area 27 are sent to the host and are used to increment the counts contained in data base 14. Both processors again reenter their idle loops.

When system timer 18 specifies that it is time to stop performance measurements in block 58 of FIG. 2, the host calls its stop performance measurements subroutine as shown in FIG. 5. The host then sends a Stop Measurements command to the workstation controller in block 86. Upon receipt of the Stop Measurements command in its processor task queue, processor 22 answers block 112 of FIG. 6 affirmatively and calls the stop workstation controller measurements subroutine of FIG. 10. Processor 22 resets the "Measurements Being Taken" flag as shown in FIG. 10, returns back to block 102 and reenters its idle loop. Meanwhile, processor 11 calls its retrieve performance measurements subroutine of FIG. 4, which causes a Retrieve Measurements command to be sent from the host to the workstation controller. The counts contained in counter save area 27 are sent to the host to increment the values contained in data base 14.

The manner in which processor 11 uses the data contained in data base 14 to arrive at performance characteristics of the attached workstation controllers will now be discussed. The workstation controller processor utilization is calculated by the following equation in block 92:

$$\text{processor utilization} = \frac{\text{(elapsed time of test/idle loop time)} - \text{idle loop count}}{\text{elapsed time of test/idle loop time}}$$

Note that determining processor utilization by using an idle loop counter is accurate, simple, and does not degrade the performance of the processor.

The workstation controller processor workload evenness is calculated by the following equation in block 93.

$$\text{processor workload evenness} = \frac{\text{processor queue count}}{\text{sample count}}$$

The workstation controller communications line utilization is calculated by the following equation in block 94:

$$\text{communications line utilization} = \frac{\text{communications usage count}}{\text{sample count}}$$

The workstation controller communications line workload evenness is calculated by the following equation in block 96:

$$\text{communications line workload evenness} = \frac{\text{communications queue count}}{\text{sample count}}$$

In block 97, the calculations performed in blocks 92, 93, 94, and 96 are analyzed and the results of this analysis are sent to the user. Specifically, the workstation controller processor utilization is analyzed to see whether it falls below a first threshold amount. In the preferred embodiment, the first threshold is 50%. If the workstation controller processor utilization is below 50%, the user is informed that the workstation controller processor performance is acceptable. If the workstation controller processor utilization is above a second threshold, the user is informed that the workstation controller processor performance is unacceptable. In the preferred embodiment, the second threshold is 70%. The threshold numbers are largely a design choice and could change depending upon the environment. For example, a multithreaded environment could have thresholds higher than in an environment that was not multithreaded. Also, if the environment employs a task priority scheme, the thresholds can be higher than an environment without a task priority scheme.

If the workstation controller processor utilization falls between the first and second thresholds, the performance is marginal and further analysis is necessary to determine if the workstation controller processor performance is acceptable. If the workstation controller processor workload evenness exceeds a third threshold, the workstation controller processor workload is considered to be uneven. An uneven workload is considered to be undesireable because the user could periodically notice poor response time.

In the preferred embodiment, the third threshold is three times the workstation controller processor utilization. This, in addition, to a workstation controller processor utilization between the first and second thresholds would indicate that the workstation controller processor performance is not acceptable and this result is sent to the user.

Block 97 analyzes the workstation controller communication line utilization and workload unevenness in a similar manner. Specifically, if the work station controller communications line utilization is less than the first threshold of 50% in the preferred embodiment, the workstation controller communications line performance is considered to be acceptable and that result is sent to the user. If the workstation controller communication line utilization is above the second threshold of 70% in the preferred embodiment, the workstation controller communication line performance is considered to be unacceptable and that result is sent to the user. If, however, the workstation controller communication line utilization is between the first and second thresholds, the performance is marginal and further analysis of the workstation controller communication line workload evenness is necessary to determine whether the performance is acceptable or not.

In the preferred embodiment, if the workstation controller communication line workload evenness is more than the third threshold of 3 times the workstation controller communications line utilization, the workload is considered to be uneven and that, in addition to a workstation controller communications line utilization between the first and second threshold would indicate that the performance of the workstation controller communication line is unacceptable, and that result is sent to the user. If the workstation controller communication line workload evenness number is less than the third threshold, the communications line performance is considered to be acceptable and that result is sent to the user.

The workload evenness thresholds for both the workstation controller processor and communications line are a design choice and can be more or less than the preferred embodiment of three times utilization, depending on the application. For example, if the WSC typically processes very many small tasks, a number greater than 3 times the utilization can still be considered acceptable.

While the preferred embodiment has been described, an alternative embodiment has been contemplated and will briefly be described.

In the alternate embodiment, line 17 connecting host 10 with WSC 20 is also a communications line, and an additional communications usage counter and communications queue counter are used in calculating the performance of communications line 17 in the same manner that the performance of communications line 29 is determined.

While the invention has been described with respect to preferred embodiments, it will be understood by those skilled in the art that various changes in detail may be made therein without departing from the spirit, scope and teaching of the invention. Accordingly, the herein disclosed is to be limited only as specified in the following claims.

What is claimed is:

1. A method for determining the performance of a processor in a computer system, comprising the steps of:
    starting a performance test of said processor;
    continuously checking to see if there are any tasks for said processor to perform;
    incrementing an idle loop count if there are no tasks for said processor to perform, responsive to said checking step;
    stopping said performance test after an elapsed time; and
    determining a processor utilization using said elapsed time, an idle loop time, and said idle loop count, said idle loop time being the time said processor takes to perform one said checking step and one said incrementing step.

2. The method according to claim 1, further comprising the steps of:
    indicating acceptable processor performance if said processor utilization is below a first threshold; and
    indicating unacceptable processor performance if said processor utilization is above a second threshold.

3. The method according to claim 2, further comprising the steps of:
    after said incrementing an idle loop count step.
    periodically sampling a processor queue having tasks waiting to be performed;
    incrementing a sample count responsive to said sampling step;
    determining the number of tasks in said processor queue waiting to be performed;
    incrementing a processor queue count by said number of tasks; and
    after said stopping step.
    determining a processor workload evenness by using said processor queue count and said sample count.

4. The method according to claim 3, further comprising the step of:
    indicating uneven processor workload if said processor workload evenness exceeds a third threshold.

5. The method according to claim 4, further comprising the steps of:
    indicating unacceptable processor performance if said processor utilization is between said first threshold and said second threshold and said processor workload evenness exceeds said third threshold.

6. A method for determining the performance of a communications line in a computer system, comprising the steps of:
    starting a performance test of said communications line;
    periodically sampling a communications queue;
    incrementing a sample count responsive to said sampling step;
    incrementing a communications usage count if there are tasks contained in said communications queue waiting to be performed;
    stopping said performance test after an elapsed time;
    determining a communications line utilization using said communications usage count and said sample count;
    indicating acceptable communications line performance if said communications line utilization is below a first threshold; and
    indicating unacceptable communications line performance if said communications line utilization is above a second threshold.

7. The method according to claim 6, further comprising the steps of:
    determining the number of tasks in said communications queue waiting to be performed, responsive to said sampling step;
    incrementing a communications queue count by said number of tasks;
    determining a communications line workload evenness using said communications queue count and said sample count.

8. The method according to claim 7, further comprising the step of:
    indicating uneven communications line workload if said communications line workload evenness exceeds a third threshold.

9. The method according to claim 8, further comprising the steps of:
    indicating unacceptable communications line performance if said communications line utilization is between said first threshold and said second threshold and said communications line workload evenness exceeds said third threshold.

10. A computer system capable of diagnosing performance bottlenecks, comprising:
    a plurality of workstation controllers each having a processor, each of said workstation controllers further comprising:
    means for continuously checking to see if there are any tasks for said processor to perform;
    means for incrementing an idle loop count if there are no tasks for said processor to perform, responsive to said checking step; and
    a host computer, connected to said plurality of workstation controllers, further comprising:

means for determining said processor utilization by using an elapsed time, an idle loop time, and said idle loop count, said idle loop time being the time said processor takes to perform one said checking step and one said incrementing step.

11. The computer system of claim 10, wherein each of said workstation controllers further comprises: means for indicating acceptable processor performance if said processor utilization is below a first threshold; and means for indicating unacceptable processor performance if said processor utilization is above a second threshold.

12. The computer system of claim 11, wherein each of said workstation controllers further comprises:

means for periodically sampling a processor queue having tasks waiting to be performed;

means for incrementing a sample count responsive to said sampling means;

means for determining the number of tasks in said processor queue waiting to be performed;

means for incrementing a processor queue count by said number of tasks;

and wherein said host computer further comprises:

means for determining a processor workload evenness by using said processor queue count and said sample count.

13. The computer system of claim 12, wherein said host computer further comprises:

means for indicating uneven processor workload if said processor workload evenness exceeds a third threshold; and means for indicating unacceptable processor performance if said processor utilization is between said first threshold and said second threshold and said processor workload evenness exceeds said third threshold.

14. The computer system of claim 13, wherein each of said workstation controllers further comprises:

means for periodically sampling a communications queue;

means for incrementing a communications usage count if there are tasks contained in said communications queue waiting to be performed;

and wherein said host computer further comprises:

means for determining a communications line utilization by using said communications usage count and said sample count.

15. The computer system of claim 14, wherein each of said workstation controllers further comprises:

means for indicating acceptable communications line performance if said communications line utilization is below a fourth threshold; and means for indicating unacceptable communications line performance if said communications line utilization is above a fifth threshold.

16. The computer system of claim 15, wherein each of said workstation controllers further comprises:

means for determining the number of tasks in said communications queue waiting to be performed, responsive to said sampling means;

means for incrementing a communications line queue count by said number of tasks;

and wherein said host computer further comprises:

means for determining communications line workload evenness by using said communications line queue count and said sample count.

17. The computer system of claim 16, wherein said host computer further comprises:

means for indicating uneven communications line workload if said communications line workload evenness exceeds a sixth threshold; and means for indicating unacceptable communications line performance if said communications line utilization is between said fourth threshold and said fifth threshold and said communications line workload evenness exceeds said sixth threshold.

* * * * *